3,318,833
COMPOSITIONS OF VINYL CHLORIDE POLYMERS, SOLVENTS THEREFOR AND N,N - DIALKYL FATTY ACID AMIDES AND SHAPED ARTICLES THEREFROM
Paul R. Cox, Jr., Cary, N.C., and William E. Lanier, Hartselle, Ala., assignors to Monsanto Company, a corporation of Delaware
No Drawing. Filed Oct. 9, 1963, Ser. No. 314,851
3 Claims. (Cl. 260—30.4)

This invention relates to novel compositions of matter. More particularly, this invention relates to novel compositions of matter comprising solutions of vinyl chloride polymers and shaped articles prepared from said solutions.

Polymers of vinyl chloride are known to be useful for the production of shaped articles such as fibers and films. Shaped articles prepared from vinyl chloride polymers having new and useful properties, such as high elasticity, would be extremely desirable. Synthetic elastic fibers are in great demand as a replacement for rubber fibers and in many new markets such as ladies foundation garments and swim suits. Therefore, solutions of vinyl chloride polymers which may be easily formed into shaped articles having desirable elastic properties would be very useful in the manufacture of such shaped articles from vinyl chloride polymers.

It is an object of this invention to provide new and useful compositions of matter comprising vinyl chloride polymers.

Another object of the present invention is to provide solutions of vinyl chloride which can be advantageously used in the formation of shaped articles by conventional methods.

It is a further object of the present invention to provide shaped articles from vinyl chloride polymers having outstanding elastic properties.

Other objects and advantages of the present invention will be apparent from the description thereof which follows hereinafter.

In general, the objects of the present invention are accomplished by mixing vinyl chloride polymer, a solvent for the vinyl chloride polymer, and a high molecular weight N,N,-dialkyl amide or mixtures of said amides. The resulting mixture is then heated, preferably with stirring or other agitation, until a free-flowing, uniform, homogeneous solution is obtained. These solutions are readily susceptible to being formed and/or drawn by known and conventional procedures into fibers, films, and the like, having good elastic properties.

High molecular weight dialkyl amides which may be used to prepare the novel compositions of the present invention are amides having the formula

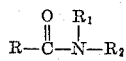

wherein R is a hydrocarbon radical containing at least 6 carbon atoms and $R_1$ and $R_2$ are alkyl radicals. Preferably, R has a value of from 11 to 21 carbon atoms and $R_1$ and $R_2$ are lower alkyl radicals of 1 to 6 carbon atoms.

Illustrative of suitable saturated amides that may be used in the preparation of the compositions of this invention are N,N,-dimethylcaprylamide, N,N-diethylcaprylamide, N,N - dimethylcaproamide, N,N - dimethylcapramide, N,N - dimethyllauramide, N,N - dimethylmyristamide, N,N-dibutyllauramide, N-methyl-N-ethylmyristamide, N,N-diethyldodecamide, N,N-diethylpalmitamide, N,N-dipropylheptadecamide, N,N-dimethylstearamide, N-methyl-N-ethyldocosamide, and the like. Illustrative of suitable unsaturated amides that may be used in the preparation of the compositions of this invention are N,N- dimethylpalmitoleamide, N,N-dimethyloleamide, N,N-dibutyloleamide, N,N-dimethyllinoleamide, N,N - diethyllinoleamide, N-methyl-N-butyl-propyllinolenamide, N,N-dimethyllinoleanamide, and the like. Mixtures of the above amides may also be used. These compounds may be prepared by reacting an acid anhydride with a dialkyl amine such as dimethyl amine.

The vinyl chloride polymers useful in the practice of the present invention include not only polyvinyl chloride, but also blends and copolymers containing at least 85 percent by weight of vinyl chloride. The invention is particularly useful with polyvinyl chloride and copolymers of 85 to 99 percent of vinyl chloride and 1 to 15 percent of an olefinic monomer copolymerizable therewith, for example, vinyl acetate, vinyl formate, vinylidene chloride, vinyl alcohol, acrylonitrile and the like.

Any solvent for vinyl chloride polymers mey be used to prepare the novel compositions of this invention. As examples of particularly suitable solvents that may be used, there may be mentioned N,N-dimethylformamide, N,N-dimethylacetamide, tetrahydrofuran, and cyclohexanone. Other suitable solvents are well-known to the art. The solvent used in each case will depend on the nature of the solution mixture, the type of coagulation bath employed, and the like.

The maximum solids concentration of the vinyl chloride polymers that can be obtained in the solution and the viscosity of the solution depend upon the nature of the vinyl chloride polymer, the solution mixture and the temperature used. Solutions containing from about 5 to 35 percent by weight of vinyl chloride polymer, 10 to 90 percent by weight of solvent, and 5 to 75 percent by weight of high molecular weight amide are possible. Solutions containing from about 10 to 25 percent by weight of vinyl chloride polymer, 20 to 80 percent by weight of solvent and 10 to 50 percent by weight of high molecular weight amide are preferred for the purposes of this invention.

The vinyl chloride polymer is mixed with a selected solvent for said polymer and with a selected high molecular weight N,N-dialkylamide. The mixture is then heated with stirring until a homogeneous solution is obtained. The mixture may be heated to a temperature from room temperature to the temperature where polymer degradation occurs, however, it is preferable to heat the mixture to a temperature of from about 50° C. to 105° C. The homogeneous solutions may then be formed into shaped articles by known and conventional procedures. It is essential in preparing the solutions of this invention that the solutions contain both the solvent for the vinyl chloride polymer and the high molecular weight N,N-dialkylamide in order that the final product will have the excellent elastic properties desired. Fibers spun using a solvent without the high molecular weight N,N-dialkylamide were not highly elastic. Conversely, fibers spun from solutions made from the high molecular weight N,N-dialkylamide without the solvent being present were also not highly elastic.

While the present invention is described as it is primarily applicable to the manufacture of fibers and filaments, it is to be understood that this is merely intended in an illustrative sense and the invention is not to be limited thereby, since the same is also applicable to the manufacture of other shaped articles of vinyl chloride polymers, such as films, rods, threads, molded articles, and the like.

For utility in fiber and filament applications, it is desirable to have elastic products which require no after curing or after treatment. In order to be suitable in textile applications for the replacement of rubber yarns, it is desirable that a synthetic elastic fiber have a tensile recovery of 90 percent or more and a stress decay of less than 20 percent. Tensile recovery is the percentage return to the original length within one minute after the tension has been released from a fiber sample which has been elongated 50 percent at the rate of 100 percent per minute, and held at 50 percent elongation for a minute. Stress decay is the percent loss in stress in a yarn one minute after it has been elongated to 50 percent at the rate of 100 percent per minute.

The following examples are used to illustrate the invention and are not intended to limit it in any way. Unless otherwise noted percentages as given in the examples indicate percent by weight.

Example 1

A solution was prepared using 171 grams of N,N-dimethylformamide, 54 grams of an amide mixture comprising 95 percent of N,N-dimethyllauramide, 3 percent of N,N-dimethylmyristamide and 2 percent of N,N-dimethylcapramide and 75 grams of a copolymer consisting of 95 percent of vinyl chloride and 5 percent of vinyl acetate. After stirring the mixture for about 35 minutes at 85° C., a clear, homogeneous, viscous solution was obtained. Fibers were extruded from this solution through a spinneret located about one-half inch above a water bath and then coagulated in the water bath. After processing, the fibers had a stress decay of 12.5 percent, an elongation at break of 516 percent, and a tensile recovery of 95 percent.

Example 2

A mixture was prepared using 50 grams of a copolymer of 95 percent of vinyl chloride and 5 percent of vinyl acetate, 41 grams of N,N- di-n-butyllauramide and 120 grams of N,N-dimethylformamide. After stirring for 30 minutes at about 80° C., a clear, homogeneous, viscous solution was obtained. Fibers were extruded from the solution through a spinneret which was located about one-half inch above a water bath and then coagulated in the bath. After processing, the fibers had a stress decay of 16.5 percent, an elongation at break of 172 percent, a tensile recovery of 94 percent, and 0.06 grams per denier tenacity at 50 percent extension.

Examples 3

A mixture was prepared using 50 grams of a copolymer of Example 2, 120 grams of N,N-dimethylformamide and 30 grams of N,N-di-n- butyllauramide. After heating for 30 minutes at about 85° C., a viscous solution was obtained. Fibers were extruded from the solution through a spinneret which was located about one-half inch above a water bath and then coagulated in the bath. The fiber had a tenacity at break of 0.2 gram per denier, 0.03 gram per denier tenacity at 50 percent extension and an elongation at break of 259 percent.

After washing for one hour at 60° C. in a water solution containing 1 gram of detergent per pint of water the fiber still had good tensile and elastic properties.

Example 4

A clear, viscous, homogeneous solution was prepared according to the conditions of Example 1 using 60 grams of the amide mixture of Example 1, 75 grams of the copolymer of Example 1, and 165 grams of N,N-dimethylformamide. Fibers were extruded from the solution through a spinneret which was located about one-half inch above a water bath and then coagulated in the bath. These fibers had a tensile recovery of 95 percent, a stress decay of 12 percent, an elongation at break of 230 percent, and a tenacity at 50 percent extension of .03 gram per denier.

Example 5

A mixture was prepared using 75 grams of the copolymer of Example 1, 186 grams of N,N-dimethylformamide, and 39 grams of the amide mixture of Example 1. After stirring the mixture for about 35 minutes at 85° C., a clear, homogeneous, viscous solution was obtained. Fibers were extruded from this solution through a spinneret which was located about one-half inch above a water bath and then coagulated in the bath. These fibers had 0.04 gram per denier tenacity at 50 percent extension, 0.2 gram per denier break tenacity, a break elongation of 305 percent, a tensile recovery of 92 percent, and a stress decay of 20 percent.

Example 6

A clear, viscous, homogeneous solution was prepared by heating 90 grams of the amide mixture of Example 1 and 10 grams of the vinyl chloride-vinyl acetate copolymer of Example 1. A film was cast from this solution and dried for 16 hours at 100° C. The film was clear, flexible, had good tensile strength, but did not exhibit a high degree of elasticity.

Example 7

A mixture was prepared in a small mixer using 1 gram of polyvinyl chloride, 4.5 grams of N,N-dimethylacetamide, and 4.5 grams of an amide mixture comprising 80 percent of N,N-dimethyloleamide, 5 percent of N,N-dimethylmyristamide, 5 percent of N,N-dimethylpalmitamide, 5 percent of N,N-dimethylstearamide and 5 percent of N,N-dimethyllinoleamide. After stirring the mixture for 3 hours at about 80° C., a clear, homogeneous, viscous solution was obtained. Clear films were cast from this solution into a methanol coagulation bath. Upon drying, these films had good elasticity resembling rubber.

Example 8

A mixture was prepared in a small mixer using 1 gram of polyvinyl chloride, 8.5 grams of N,N-dimethylacetamide, and 0.5 gram of the amide mixture of Example 7. After stirring the mixture for 2.5 hours at about 80° C., a clear, homogeneous, viscous solution was obtained. Films were cast from this solution into a water coagulation bath. These films had rubber-like elastic properties and good tensile strength.

Example 9

A mixture was prepared in a small mixer using 1 gram of polyvinyl chloride, 4.5 grams of N,N-dimethylformamide, and 4.5 grams of the amide mixture of Example 1. After stirring the mixture for 30 minutes at about 65° C., a clear, homogeneoeus, viscous solution was obtained. Clear films were cast from this solution into a coagulation bath consisting of 60 percent of methanol and 40 percent of water. The dried films were clear, had good strength and was highly elastic resembling rubber.

Example 10

A mixture was prepared using 30 grams of polyvinyl chloride, 85 grams of N,N-dimethylformamide, and 85 grams of the amide mixture of Example 1. After stirring the mixture for 30 minutes at about 65° C., a clear homogeneous, viscous solution was obtained. Fiber was extruded from this solution into a coagulation bath consisting of 60 percent of methanol and 40 percent of water. The fiber obtained had good elasticity and good tensile strength.

Example 11

A mixture was prepared using 1 gram of polyvinyl chloride, 4.5 grams of tetrahydrofuran, and 4.5 grams of an amide mixture comprising 50 percent of N,N-dimethylcaprylamide, 40 percent of N,N-dimethylcapramide, 5 percent of N,N-dimethylcaproamide, and 5 percent of N,N-dimethyllauramide. After stirring the mixture for 3 hours at about 65° C., a clear, homogeneous, viscous solution was obtained. Clear film was cast from this solution into a methanol coagulation bath. The film obtained had rubber-like properties and good tensile strength.

Example 12

A mixture was prepared using 1 gram of polyvinyl chloride, 4.5 grams of cyclohexanone and 4.5 grams of an amide mixture comprising 50 percent of N,N-dimethylstearamide, 40 percent of N,N-dimethylpalmitamide, 5 percent of N,N-dimethylmyristamide and 5 percent of N,N-dimethyloleamide. After stirring this mixture for 2 hours at about 65° C., a clear, homogeneous, viscous solution was obtained. A clear film was cast from this solution into a methanol coagulation bath. The film obtained had rubber-like properties and good tensile strength.

Example 13

A mixture was prepared using 1.5 grams of polyvinyl chloride and 8.5 grams of N,N-dimethylacetamide. After the mixture was stirred for 1 hour at 90° C., a clear, homogeneoeus, viscous solution was obtained. No high molecular weight amide was used to prepare this solution. Fibers were extruded from this solution into water. The fibers obtained were clear and had good tensile strength. These fibers did not exhibit the elastic-like properties of the fibers prepared from a vinyl chloride polymer, a solvent for the polymer, and a high molecular weight amide.

Example 14

A solution was prepared following the procedure of Example 13 using one gram of polyvinyl chloride and 9 grams of the amide mixture of Example 7. No solvent, such as N,N-dimethylacetamide, was used to prepare this solution. Film was extruded from this solution into a methanol bath. The film obtained was clear and flexible, but did not exhibit the high degree of elasticity shown by films prepared from a vinyl chloride polymer, a solvent for the polymer, and a high molecular weight amide.

As many widely different embodiments of this invention may be made without departing from the spirit and scope thereof, it is to be understood that the invention is not limited to the specific embodiment thereof, except as defined in the appended claims.

What is claimed is:

1. A new vinyl chloride resinous composition comprising a homogeneous mixture of from about 10 to 25 percent of a polymer selected from the group consisting of polyvinyl chloride and a copolymer containing 95 percent of vinyl chloride and 5 percent of vinyl acetate, from about 20 to 80 percent of a solvent for said polymer selected from the group consisting of N,N-dimethylformamide, N,N-dimethylacetamide, tetrahydrofuran, and cyclohexanone, and from about 10 to 50 percent of an additive selected from the group consisting of (1) N,N-di-n-butyllauramide, (2) an amide mixture containing 95 percent of N,N-dimethyllauramide, 3 percent of N,N-dimethylmyristamide, and 2 percent of N,N-dimethylcapramide, (3) an amide mixture containing 80 percent of N,N-dimethyloleamide, 5 percent of N,N-dimethylmyristamide, 5 percent of N,N-dimethylpalmitamide, 5 percent of N,N-dimethylstearamide, and 5 percent of N,N-dimethylinoleamide, (4) an amide mixture containing 50 percent of N,N-dimethylcaprylamide, 40 percent of N,N-dimethylcapramide, 5 percent of N,N-dimethylcaproamide, and 5 percent of N,N-dimethyllauramide, and (5) an amide mixture containing 50 percent of N,N-dimethylstearamide, 40 percent of N,N-dimethylpalmitamide, 5 percent of N,N-dimethylmyristamide, and 5 percent of N,N-dimethyloleamide.

2. A shaped article formed from the composition as defined in claim 1.

3. A fiber extruded from the composition as defined in claim 1.

References Cited by the Examiner

UNITED STATES PATENTS

| | | | |
|---|---|---|---|
| 2,325,947 | 8/1943 | Garvey | 260—32.6 |
| 2,984,593 | 5/1961 | Tsaksen et al. | 260—32.6 |
| 3,110,548 | 11/1963 | Fukushima et al. | 260—32.6 |

FOREIGN PATENTS 730,393   5/1955   Great Britain.

OTHER REFERENCES

Buttrey: Plasticizers, Franklin Publishing Co., Inc., 1960, pp. 9, 10.

MORRIS LIEBMAN, *Primary Examiner.*

L. T. JACOBS, *Assistant Examiner.*